United States Patent [19]

Sunderland et al.

[11] Patent Number: 5,725,752
[45] Date of Patent: Mar. 10, 1998

[54] ELECTROKINETIC DECONTAMINATION OF LAND

[75] Inventors: John Garry Sunderland, Chester; Edward Pelham Lindfield Roberts, South Wirral, both of United Kingdom

[73] Assignee: EA Technology Ltd., Chester, United Kingdom

[21] Appl. No.: 628,749

[22] PCT Filed: Oct. 22, 1993

[86] PCT No.: PCT/GB94/02319

§ 371 Date: Apr. 18, 1996

§ 102(e) Date: Apr. 18, 1996

[87] PCT Pub. No.: WO95/11095

PCT Pub. Date: Apr. 27, 1995

[30] Foreign Application Priority Data

Oct. 22, 1993 [GB] United Kingdom ............. 9321791

[51] Int. Cl.⁶ .................................................. C25C 1/22
[52] U.S. Cl. ................. 205/687; 204/515; 204/516; 204/517; 204/600; 204/648
[58] Field of Search ........................ 205/687; 204/515, 204/516, 517, 600, 648

[56] References Cited

U.S. PATENT DOCUMENTS

| 4,445,990 | 5/1984 | Kim et al. ............................. 204/151 |
| 4,551,274 | 11/1985 | Shen ...................................... 205/700 |
| 4,702,804 | 10/1987 | Mazur et al. ........................ 205/688 |
| 4,950,368 | 8/1990 | Weinberg et al. .................. 205/450 |
| 5,137,608 | 8/1992 | Acar et al. ........................... 204/130 |
| 5,240,570 | 8/1993 | Chang et al. ....................... 204/130 |
| 5,476,992 | 12/1995 | Ho et al. ............................... 588/204 |

FOREIGN PATENT DOCUMENTS

| 0 312 174 | 4/1989 | European Pat. Off. . |
| 312174 | 4/1989 | European Pat. Off. . |
| 0 504 551 | 9/1992 | European Pat. Off. . |
| 92/12931 | 8/1992 | WIPO . |

*Primary Examiner*—Arun S. Phasge
*Attorney, Agent, or Firm*—Westman, Champlin & Kelly, PA

[57] ABSTRACT

A method is provided for the electrokinetic decontamination of land or other material comprising soil in which a direct current is applied between at least one cathode (2) and at least one anode (4) positioned in or on said soil. The anode (4) is a carbon felt wrapped around current (10) and electrolyte feeders and the cathode (2) is contained in a porous housing (6) through which electrolyte is able to pass. On application of current there is electrokinetic movement of cations and other soil contaminants towards the cathode which pass through the porous housing and into the catholyte. The thus loaded catholyte is circulated through a treatment plant.

16 Claims, 5 Drawing Sheets

ELECTROKINETIC DECONTAMINATION OF LAND

The invention relates to the decontamination of land using an applied DC electric field applied across electrodes buried in the land or other material comprising soil including landfill sites and soil heaps. It is well known that, when a DC current is applied across a porous non-conducting matrix made up of fine pores containing water, the water phase is drawn towards the cathode. This phenomenon is termed electroosmosis. The transport of the water phase does not obey Faraday's Laws but is related to the zeta potential of the solid phase, in this case soil. The zeta potential is a function of conductivity, viscosity and dielectric constant of the aqueous phase contained within the soil. When ionic species are present in the aqueous phase cations are moved through the soil with the water phase towards the cathode under the influence of the applied field. There will also be a simultaneous movement of anions towards the anode in the applied field against the electroosmotic flow. Electrophoretic movement of colloids suspended in the aqueous phase will also occur. Electroosmotic and electrophoretic processes are termed electrokinetic phenomena. The electroosmotic transport process is maximised when the conductivity is low.

As a result of the electroosmotic process, dissolved cations are moved to the cathode and by virtue of water movement past the soil interface, absorbed ions will be leached from the soil and will pass into the aqueous phase. Similarly, water-soluble organic species contained within the soil matrix will also pass into the aqueous phase. The extent of the leaching process will depend on the affinity of the ions or organic species for the water phase relative to that for the soil phase.

The use of water soluble electrolytes, surfactants, complexing agents or polyelectrolyte leachants and mineral or organic acids which have an affinity for absorbed/adsorbed species, can aid removal of contaminants when introduced in solution into the soil.

It is well known that when an electrode operates as a cathode in a near neutral aqueous solution, as would generally be the case for soil groundwater, the pH increases in the region of the cathode. If metal cations drawn with the aqueous phase to the cathode form insoluble hydroxides at the cathode, these hydroxides will precipitate and cause problems of removal from the vicinity of the cathode. Examples of cations forming insoluble hydroxides are iron, copper and chromium. A solution to this problem is to maintain the pH of the cathode solution (catholyte) below a threshold pH limit to prevent hydroxide formation and hence precipitation. This can be achieved by placing the cathode in a permeable chamber through which the catholyte is circulated, preferably slowly. The pH can be adjusted conveniently at or above ground level to prevent susceptible metal species precipitating. The dissolved species can be removed by a variety of means e.g. solvent extraction, electrochemical treatment, ion-exchange, activated carbon adsorption or alkaline precipitation. It is also common practice in some electrokinetic devices to control the pH adjacent to the anode. This is disclosed by Drinkard in U.S. Pat. No. 3,956,087 for the extraction of copper from ore, and by Hydroconsult B.V. for the removal of metal contaminants from soil as disclosed in EP-A-312 174.

As a consequence of the electroosmotic process water is drawn towards the cathode, causing the resistivity of the soil to increase around the anode. In order to prevent the soil from becoming too resistive adequate electrical contact between the soil and the anode must be maintained; this can be achieved by bringing electrolyte into contact with the soil, for example, by using a porous delivery means, e.g. an unglazed pipe or some other porous material so that electrolyte is provided in the vicinity of the anode. Although it may be thought advantageous to enclose the anode in a porous housing containing electrolyte and control the pH, as is required in the method described by Hydroconsult, there are disadvantages to this procedure. There will be a loss of electrolyte from the anode porous chamber due to both normal diffusion, osmotic processes and electric field effects as well as loss of electrolyte due to a hydrostatic head. The rate of loss of electrolyte from the anode housing will thus be difficult to control. This may lead to a high soil resistivity around the anode or excessive loss of electrolyte causing contamination of the groundwater below the electrode structure. In addition, if any organic additives are introduced into the anolyte these can undergo oxidation resulting in a loss of such organic additive.

The present inventors have now found that improvements in electrokinetic decontamination of land can be achieved by use of an anode of a carbon felt material.

In accordance with the first aspect of the invention there is provided a method for the electrokinetic decontamination of land or other material comprising soil, including landfill sites and soil heaps, wherein a substantially DC electric field is applied between at least one cathode and at least one anode, the anode being a carbon felt wrapped around current and electrolyte feeders.

The carbon felt material for the anode may be comprised of fibres 5–10 microns in diameter and of variable length. The felt can "break up" under certain conditions of voltage, current and degree of saturation of the carbon felt by water. In laboratory experiments it has been observed that part of the carbon is oxidised and forms colloidal carbon which has been observed to migrate or is transported with the mobile water phase to the cathode. Activated carbon felt can be used to absorb chemicals from solution and in addition can also be used as an anode to aid in the removal of organic contaminants.

A typical anode assembly for use in the method of the invention comprises the carbon felt anode material wrapped around a suitable current feeder and one or more electrolyte feed means. The entire assembly is placed in an augured bore hole in the contaminated land. In one embodiment the carbon felt is wrapped around an electrolyte feed means which comprises individual tubes of varying lengths. In another embodiment the electrolyte feed means includes a porous tube around which the carbon felt is wrapped. The electrolyte is then fed through the porous tube to the anode. Either of these arrangements ensures good distribution of the electrolyte along the length of the felt.

A cathode assembly for use in accordance with the method of the invention comprises a cathode, which may be, for example of stainless steel or alternatively a carbon felt material like the anode, within a porous housing, the housing allowing the passage of electrolyte therethrough. The cathode assembly may be placed in an augured bore hole in the same way as the anode. Alternatively, it may lay horizontally on the surface of the soil. Either way the catholyte, which is independent of any electrolyte fed to the anode, is brought into contact with the cathode by introduction into the space between the porous housing and the cathode. The catholyte flowing around the cathode is then led away to a treatment plant. During the passage of direct current between the cathode and the anode in accordance with the invention, cations and other soil contaminants migrate towards the cathode due to the various electrolytic processes described herein and pass through the porous housing into the catholyte. These contaminants are then dealt with by various known methods in the treatment plant.

A particular advantage of housing the cathode inside a porous housing rather than in direct contact with the soil is that the pH in the vicinity of the cathode can be controlled by acidifying the catholyte stream. Precipitation of hydroxides can therefore be avoided.

In accordance with a second aspect the invention comprises a kit of components for assembly into anodes and cathodes suitable for use in the method of the invention. In particular a kit in accordance with this aspect comprises at least a carbon felt material suitable for use as an anode, a current feeder for said anode and one or more tubes suitable for feeding electrolyte to said anode. Optionally, such a kit may include as an electrolyte feeder, a porous tube around which the carbon is wrapped. Furthermore, preferably the kit will also include a cathode, a porous housing for said cathode and optionally means for feeding catholyte to and removing catholyte from said cathode and means for treating said catholyte to remove contaminants therefrom.

BRIEF DESCRIPTION OF THE DRAWINGS

The invention will now be described with reference to the accompanying drawings, in which.

Figure 1:
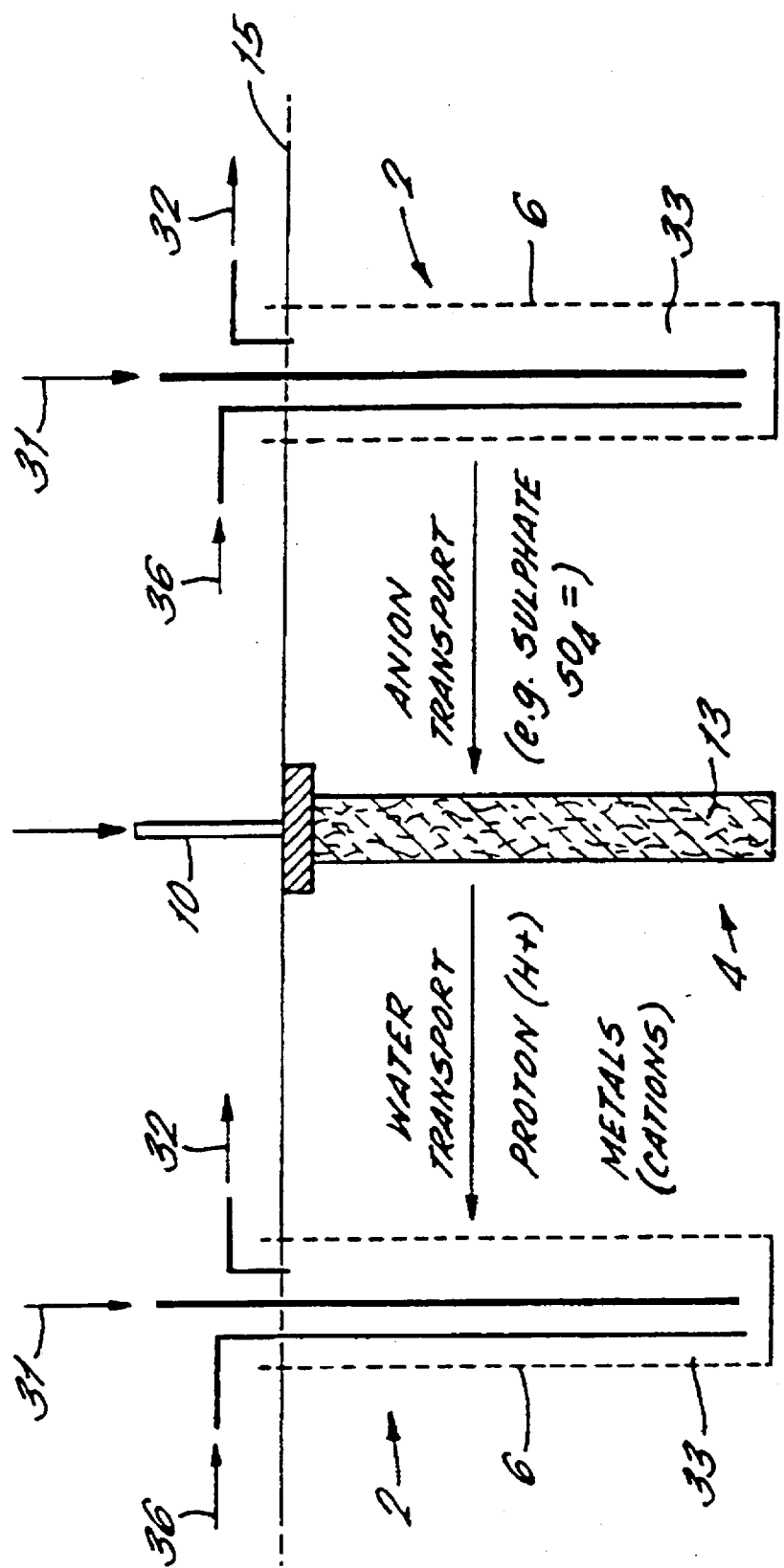
FIG. 1 is a schematic drawing showing anode and cathodes in use in accordance with the method of the invention.

The apparatus and method of the invention are shown schematically in FIG. 1. Cathode and anode assemblies 2 and 4 respectively are sunk into argured bore holes in the ground 15. The cathodes are surrounded by a porous housing 6 through which catholyte is passed by means of inlet and outlet tubes 36 and 32 respectively. When a DC electrical field is applied between the anode and the cathode, cations migrate to the cathode and anions to the anode as is expected when an electric field is applied across an electrolyte. However, in addition to ionic transport, water is caused to move through the fine porous structure of the soil under the influence of the applied field to the cathode. If the porous housing 6 of the cathode, which may include a microporous separator, possesses a high zeta potential water will also enter the cathode chamber by electroosmosis. The extent to which water transport occurs will also depend on the relative ionic strengths of the catholyte and the electrolyte within the pores of the soil. For example clay minerals generally possess a negative zeta potential which would tend to facilitate electroosmosis.

Suitable anode and cathode assemblies for use in accordance with the method of the invention are shown in more detail in FIGS. 2 to 6.

Figure 2:
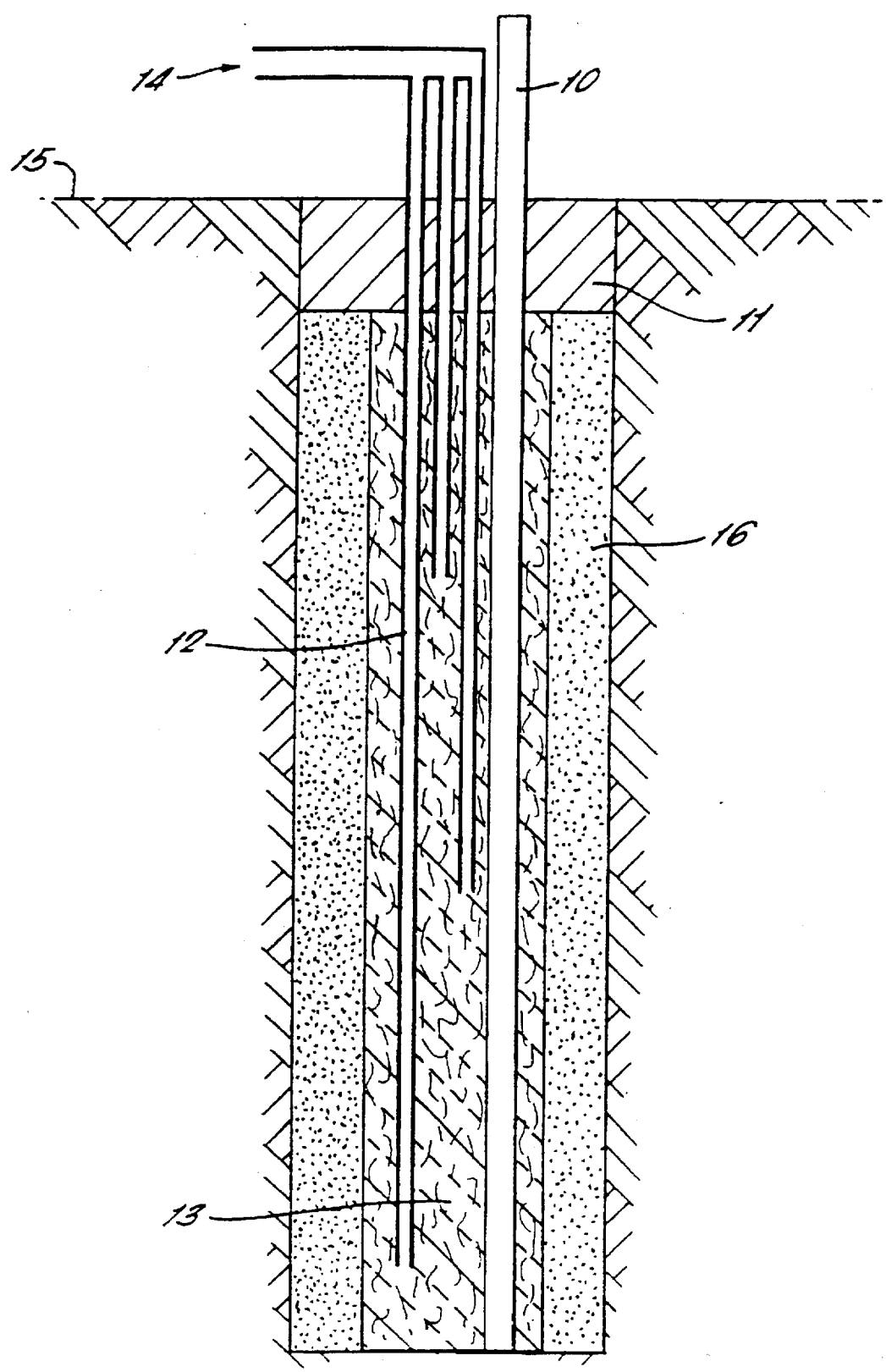
FIG. 2 is an illustration of an anode assembly.

A typical anode assembly as shown in FIG. 2 consists of a carbon felt anode 13 wrapped around an anode current feeder 10 and electrolyte feed tubes 12. The anode current feeder 10 may be a rod of carbon, a coated noble metal or other stable or moderately stable conducting material. In circumstances where the current density is maintained below 20 A sq.m. the rate of oxidation of the carbon felt, due to the relatively high surface area compared with, for example a plate electrode, is very low. The current feeders need only provide current contact points down its length as required to maintain the required current distribution. A bundle of electrolyte feed tubes 12 may be used to introduce electrolyte along the length of the carbon felt anode. This assembly is placed in a hole augured in the contaminated soil with the major part of the assembly being below ground level 15. A back-fill 16 of sand or fine soil is placed around the carbon felt anode 13 to ensure intimate contact with the surrounding contaminated land. A bentonite plug 11 can be used to seal the top of the anode assembly. This will limit the ingress of rainwater and will help to contain the oxygen formed at the anode within the soil volume between the electrodes. The feed electrolyte 14 can be simply controlled to ensure that conductivity around the electrode is maintained while avoiding excessive addition which may lead to contamination of groundwater.

Figure 3:
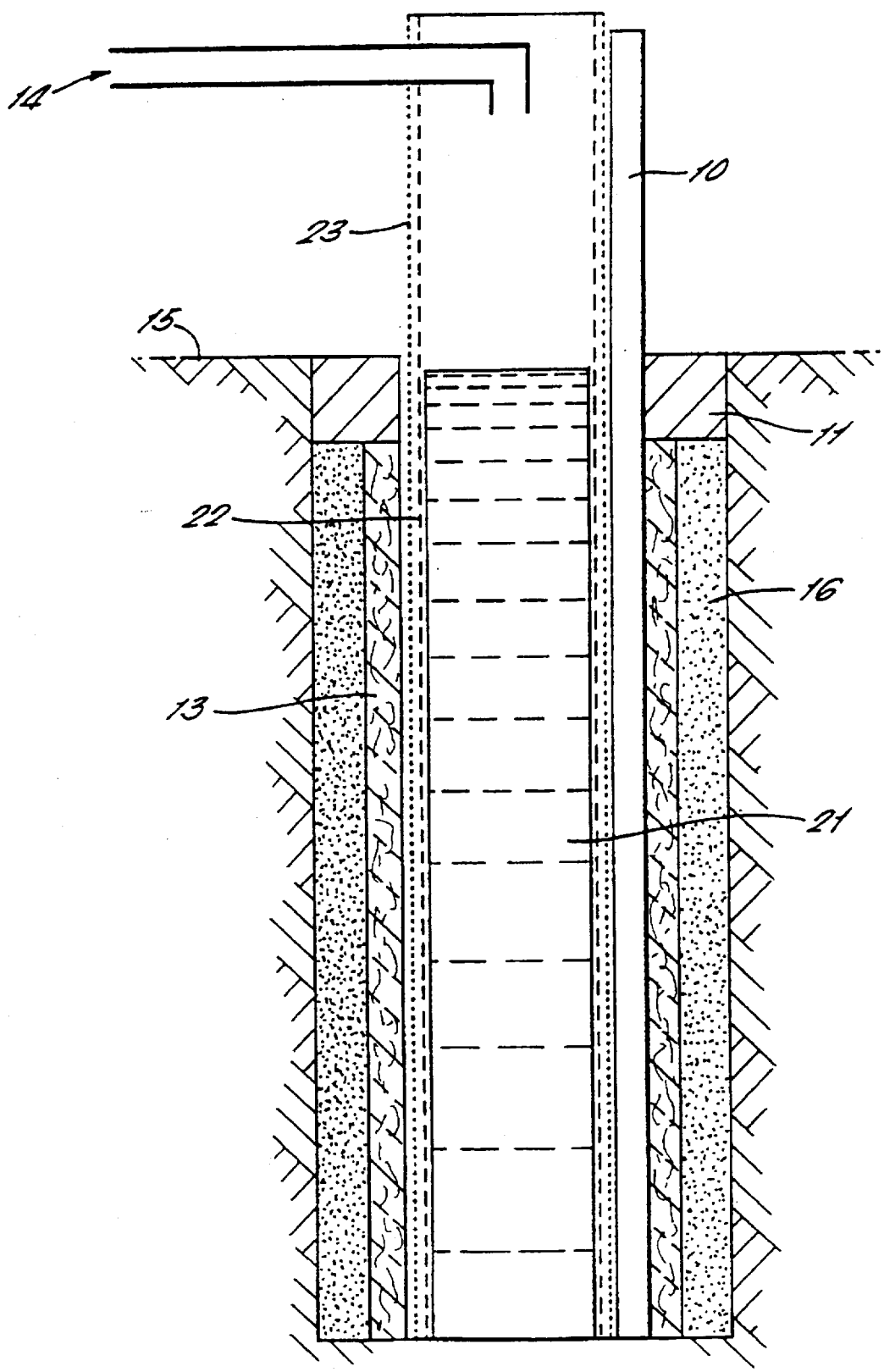
FIG. 3 is an illustration of alternative anode assembly.

An alternative anode design is shown in FIG. 3. In this case the carbon felt anode 13 is wrapped around a slotted PVC tube 23 as well as the anode current feeder 10. A PVC slotted tube 23 is used to support a tubular microporous separator 22 closed at its lower end. As before the assembly is placed in a hole augured in the contaminated soil with the major part of the assembly being below ground level 15. A back-fill 16 of sand or fine soil is placed around the carbon felt anode 13 to ensure intimate contact with the surrounding contaminated land. A bentonite plug 11 can be used to seal the top of the anode assembly. In this case the controlled electrolyte feed 14 is fed to the inside of the PVC slotted tube 23 and tubular microporous separator 22. The electrolyte 21 inside the separator will then seep through the microporous separator 22 along the length of the carbon felt anode ensuring that good conductivity is maintained.

Figure 4:
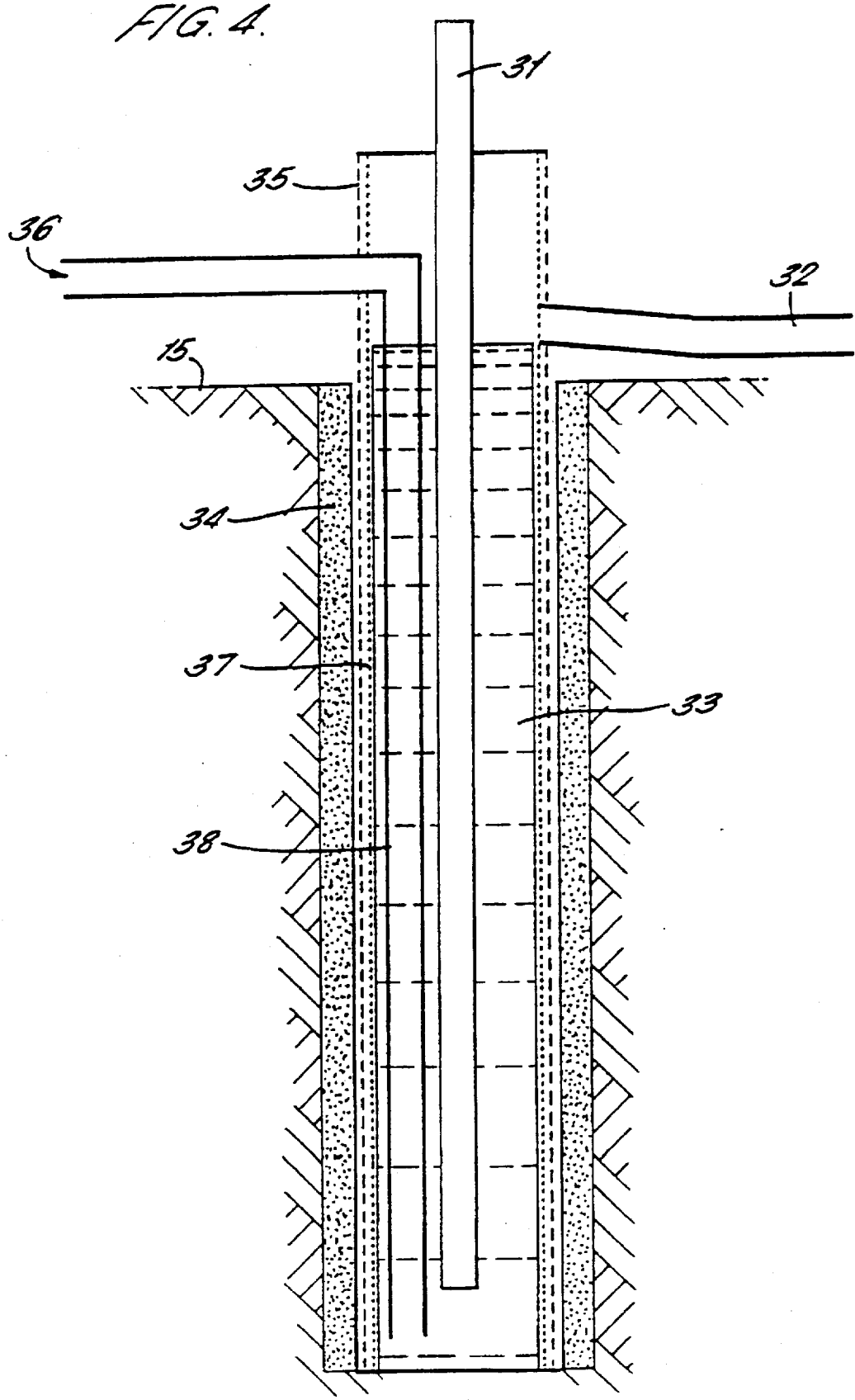
FIG. 4 is an illustration of a cathode assembly.

A typical cathode assembly is shown in FIGS. 4. A stainless steel tube cathode 31 is positioned within a microporous tubular separator 37 which is positioned within a PVC slotted tube 35. Stainless steel is the preferred material for the cathode 31 as it is corrosion resistant. Other suitable materials are for example nickel or Ebonex (titanium suboxide). An overflow tube 32 is provided in the top region of the cathode assembly, so that catholyte can be circulated to a small holding tank (not shown in Figure) set at a level below the overflow tube 32. Catholyte 33 is fed to the inside of the microporous separator 37 via an inlet tube 36. The catholyte feed tube 38 extends close to the bottom of the microporous tubular separator 37 to ensure that a supply of fresh electrolyte is maintained along the length of the stainless steel cathode 31. As with the anode the assembly is placed in a hole augured in the ground and back-filled with fine soil or sand 34 to ensure that electrical contact is made with the surrounding contaminated ground.

As an alternative the cathode may be a carbon felt material the same as the anode. The carbon felt is a porous material and therefore, can absorb electrolyte. The felt can be brought into contact with a metal current feeder by wrapping the felt around said current feeder. A polymer microporous separator can in turn surround the current feeder and felt. Advantageously an additional polymer cloth e.g. polypropylene or polyester filter cloth can be placed over the previously described assembly to protect the microporous housing. Following the use of an augur to provide a hole in the ground the assembly can be lowered into the hole which can then be backfilled with sand or soil. Included in such a cathode assembly is also a tube which extends to the region below the cathode felt into which electrolyte is introduced.

Figure 5:
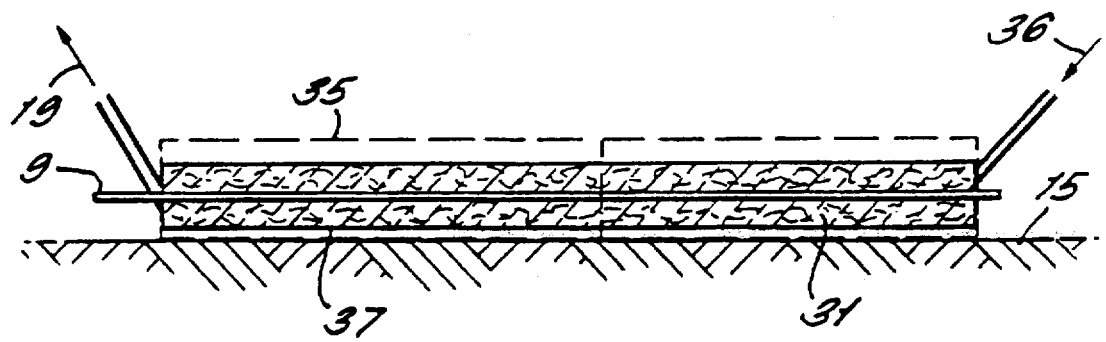
FIG. 5 is an illustration of an alternative cathode assembly.

A similar structure to that described above can be operated in a horizontal plane by being brought into contact with the surface of the ground as shown in FIG. 5. In such an embodiment the carbon felt cathode 31 surrounds a current feeder 9 and is itself surrounded by a microporous separator 37 and a PVC slotted tube 35. Catholyte flows from inlet 36 to outlet 19 along the length of the carbon cathode. The advantage of such a structure is that it can form to the contour of the soil surface providing a good electrical contact area. This also has the advantage of reducing the disturbance of the contaminated soil during installation. Electrolyte can flow through this cathode structure in order to control the required conditions to give efficient operation. A reduced hydrostatic pressure is obtained on the microporous separator when this configuration is employed.

Figure 6:
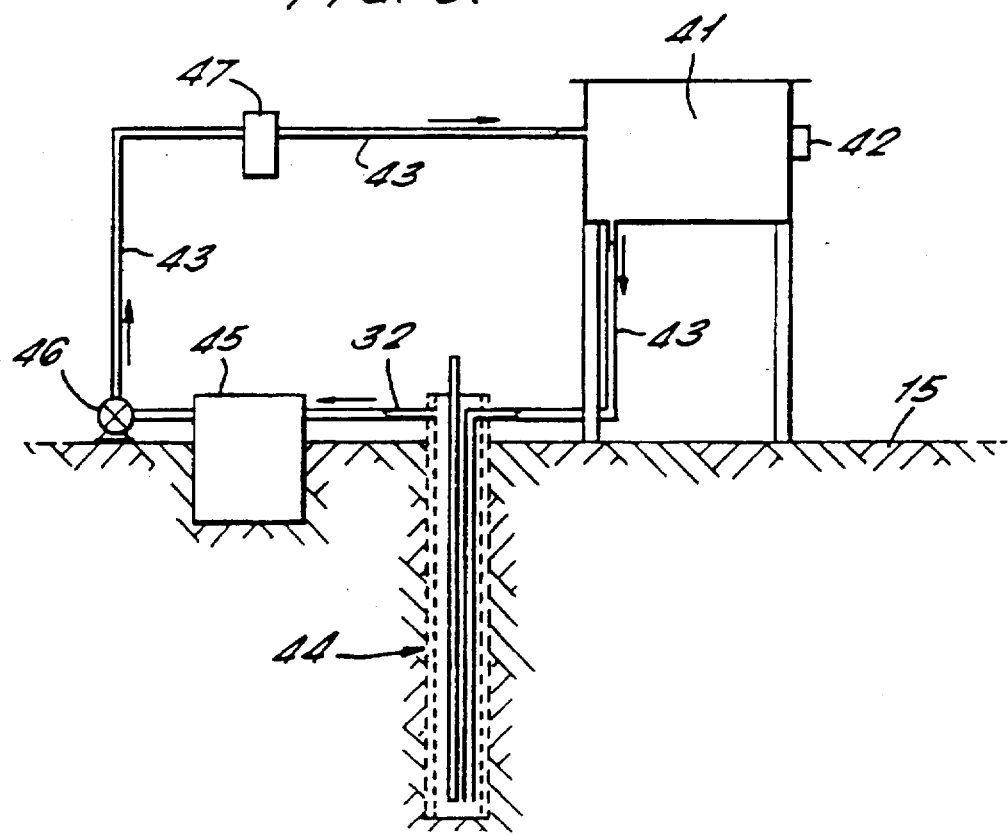
FIG. 6 is a schematic drawing of a catholyte flow loop.

FIG. 6 is a schematic drawing of the whole catholyte loop. The small catholyte holding tank 45, located partly above ground level 15, is provided with high and low level detectors (not shown) so that when the tank is full the level detector activates pump 46 and electrolyte is pumped through to the main catholyte tank 41. When the level in tank 45 falls below a lower set point a second switch (not shown) is activated and pump 46 is switched off. Electrolyte is fed under gravity to the cathode assembly 44. The control of pH is effected in holding tank 41, normally a pH=3 is maintained by the addition of acid, control being maintained using pH controller 42. Flow of electrolyte proceeds from the main catholyte tank 41 through piping 43 as shown by the arrows into the cathode assembly 44 and out from the cathode assembly via overflow 32 to the small holding tank 45 and through pump 46 to a treatment unit 47. In the treatment unit 47 contaminants are removed and a bleed of electrolyte may be taken to ensure that unwanted chemicals do not build up over time. The treatment unit 47 may utilise electrochemical, ion exchange or precipitation techniques. In the case of metal contaminants a high surface area electrochemical cell may be used to maintain the metal ion concentration in the catholyte at a low level so that metal is not deposited on the cathode. For metals of high value this has particular advantages as the metal can be recovered directly. Furthermore the electrochemical cell will generate acid which will reduce the operating costs associated with the pH control.

The catholyte consists preferably of an electrolyte that does not bring about the precipitation of one of the ions entering the catholyte at the pH at which the catholyte is maintained. For instance acetic acid can be used as the catholyte and maintained at a pH sufficiently acid to prevent hydroxides from precipitating. Acetic acid is found to be beneficial due to the cations which enter the catholyte chamber having a small overall buffering effect so that a wider range of pH conditions can be tolerated, typically 2.5 to 5, without any problems of precipitation being encountered.

In the case of the anolyte water is preferably added to the carbon felt. Ionic species already in the soil provide the necessary ions for current to flow and oxygen and the acid (proton formed as a result of the anodic oxidation of water) to enter the soil directly. Obviously additives can be introduced into the water feed if required. Examples of the additives are dilute acetic, polyelectrolytes and the like. The additives added via the carbon felt allow a more controlled addition of electrolyte than is the case when a porous housing is used. This is because the electrolyte is "held" within the carbon felt and migrates substantially only under the influence of the electric field.

In the practice of the present invention a plurality of anodes and cathodes will generally be used. These electrodes are placed in holes augured in the soil and the voids left around the slotted tubes are filled with a suitable material, e.g. soil or sand etc. With the electrodes introduced to a depth of 1 m. a cathode-cathode, anode-cathode interelectrode distance of 0.8 m to 1.25 m respectively was found to provide a maximum transport rate within 1 cu. m volume of soil treated.

The use of an anode in intimate contact with the soil allows oxygen generated at the anode to both dissolve in the water surrounding the anode and, if a sufficiently high oxygen pressure develops, the soil may be oxygenated. The use of bentonite to "seal" the top of the bore hole is advantageous. By providing a bore hole some distance from the anodes and applying a reduced pressure oxygen can be encouraged to be distributed more readily through the soil. By utilising the electrolytic oxygen and a suitable electrolyte at the appropriate pH biological activity within the soil can be stimulated so that organic contaminants can be eliminated by a biological procedure.

Groundwater conditions can be controlled by introducing electrolyte either at the soil surface, from separate porous housing(s) or from the electrode housings, and extracting ground water at separate locations using conventional well points. This will cause a flow of ground water through the pores of the soil by hydraulic gradients set up by dynamic changes in the water table. Water containing the colloidal carbon will be drawn to these well points. In this way the groundwater conditions around the electrodes can be controlled. The electrolyte introduced into the ground can alter the pH of groundwater either to enhance biological remediation processes or to encourage leaching of adsorbed pollutants from the soil surface; nutrients may be introduced or other additives used which will enhance decontamination. The water table around the electrodes can also be controlled by this means to enhance the conductivity of the soil.

It is also advantageous to introduce electrolytes into the region between the electrodes, not just adjacent to the electrodes. This region can extend to form an envelope volume between and beyond the volume directly between the electrodes. It is advantageous to have bore holes set at different depths through which electrolytes can be introduced. The diameter of the bore holes need only be small e.g. 15 mm and can be prepared by forming a hole by removing a core of earth to the desired depth. A dosing tube can then be inserted into the hole and back-filled with sand or soil. The top of the hole may be sealed with bentonite in order to ensure that conditions are controlled. The inserted tube may have an open bottom or if closed at the bottom the tube is porous. On addition of leachant, this percolates into the soil. The rate of transfer into the soil can be controlled by choosing the porosity of the dosing tube. It is desirable to use a non-metallic dosing tube to avoid stray field corrosion, e.g. porous PVC or a porous ceramic. This technique for adding leachants to soil allows remediation to be carried out in a more controlled manner across a site and allows areas to be treated more intensively than with an anode requiring a controlled environment. The leachants can comprise non-ionic, cationic and anionic surfactants, organic or mineral acids. They can be used individually or blended as appropriate to facilitate the effective removal of contaminants present in the soil. In the case of organic contaminants it is desirable to use organic additives which are soluble in water.

For land contaminated with organic pollutants where the major electrochemical process that occurs in the soil is the electro-osmotic transport of water the preferred additives are non-ionic or cationic surfactants. Examples of the former are polyethoxyethanols, polyoxyethylene esters and ester ethers, phenotic ethylene oxides and the polyolefinic dihydric alcohols. However the use of cationic surfactants e.g. a quaternary ammonium salt of which cetylpyridinium bromide, methyldodecybenzyltrimethylammonium chloride, tetraethyl ammonium hydroxide or perchlorate, may be desirable surfactants to employ with some of the organic contaminants encountered in the polluted soil. Anionic surfactants are typified, for example by the sodium alkyl benzene sulphonates, sodium lauryl sulphate or sodium salt of the primary alcohols.

In experiments in which Brij 35™, a commercially available non-ionic surfactant, was added to water the removal of p-chlorophenol from soil was enhanced when compared with water without the additive.

Examples of additives for aiding the removal of metal contaminants include the mineral acids e.g. dilute sulphuric, hydrochloric, phosphoric, nitric or perchloric acids. Alternatives are the organic acids, acetic and the higher aliphatic acids. In the case of the organic acids these are biodegradable. The additives, at the appropriate concentration for facilitating the removal of the soil contaminant, are added as an aqueous solution via a suitable bore hole.

The invention will be further explained by the following example.

EXAMPLE 500 ppm of nickel was added to silica sand. A noble plate anode was installed within an electrolyte chamber with circulating anolyte. A cathode faced the anode assembly containing catholyte which was slowly circulated through an ion-exchange resin column before being returned to the cathode chamber. The pH was maintained at 3. A current density of 20 A sq.m was applied. Over 20 hours the voltage slowly increased.

A second cell system was set up which utilised carbon felt in place of the noble metal coated electrode. In this case water was added slowly to the carbon felt and at such a rate that water remained within the cell system. The cell voltage remained stable over the period of the experiment. The catholyte conditions and the metal removal technique were identical in the two cases.

It was observed that the amount of nickel removed was approximately the same in both cases but that in the case of the carbon felt the cell voltage was lower. The sand when the carbon felt was used resulted in a more acidic condition but a lower overall moisture content which could facilitate the subsequent removal of organic contaminants from the soil surface. It was also noted that a small amount of a black substance was dispersed in the sand. This was identified as colloidal carbon. The anode showed only minor evidence of oxidative breakdown.

In large scale experiments using electrodes placed in contaminated ground (FIGS. 1 and 6) it was observed that higher currents could be sustained when a carbon felt anode was used when compared with a noble metal electrode contained within a housing. The current could be up to 100% higher for same applied voltage. 50% was more typical of the improvement. This behaviour was maintained over one month's operation with no obvious falling off in current.

Typical results obtained when the electrokinetic rig was operated over several days to deliberately build up the concentration of metals prior to the metals being removed from the catholyte, i.e. prior to the metals being removed from the catholyte by precipitation are shown below.

e.g. metal ions transported into the catholyte.

| Iron | Copper | Manganese | Zinc | Lead | Calcium |
| --- | --- | --- | --- | --- | --- |
| 2500 ppm | 0.2 ppm | 277 ppm | 7.8 ppm | 88 ppm | 320 ppm |

We claim:
1. A method for electrokinetic decontamination of land or other material comprising soil, wherein a substantially DC electric field is applied between at least one cathode and at least one anode to thereby generate oxygen at the anode, the anode being a carbon felt wrapped around current and electrolyte feed means, and wherein the carbon felt is in direct contact with the soil.

2. A method as claimed in claim 1, wherein the cathode is contained in a porous housing which allows electrolyte to pass across the housing means.

3. A method as claimed in claim 2, wherein the housing means is also present to control pH of a catholyte.

4. A method as claimed in claim 2, wherein the porous housing for the cathode comprises a material selected from the group consisting of a ceramic material, a micro-porous polymer material, and closely woven filter cloth.

5. A method as claimed in claim 1, wherein the anode comprises carbon, activated carbon or graphite fibres which are oxidised during passage of the DC current and thereby provide colloidal carbon which moves in the applied field with the aqueous phase.

6. A method as claimed in claim 1, wherein the anode current feeder is a corrosion resistant material.

7. A method as claimed in claim 6, wherein the corrosion resistant material is a noble metal coated titanium.

8. A method as claimed in claim 1, wherein electrolyte is introduced at a controlled rate to the carbon felt anode via one or more feed pipes located inside the carbon felt.

9. A method as claimed in claim 1, wherein the carbon felt is wrapped around a porous housing into which electrolyte is introduced at a controlled rate.

10. A method as claimed in claim 9, wherein the porous housing for an anolyte formed by the electrolyte comprises a material selected from the group consisting of a ceramic material a micro-porous polymer material, and closely woven filter cloth, the housing being supported on a slotted supporting plastic pipe.

11. A method as claimed in claim 1, wherein the augured hole containing the anode assembly is sealed to prevent oxygen produced at the anode venting to atmosphere.

12. A method as claimed in claim 1, wherein between the anode and cathode there are provided well points, and ground water is selectively extracted and introduced at the well points.

13. A method as claimed in claim 1, wherein the cathode is made from a material selected from the group consisting of stainless steel, nickel, titanium suboxide and carbon felt.

14. A method as claimed in claim 1, wherein water selectively containing one of the components in the group consisting of water soluble electrolytes, non-ionic surfactants, cationic surfactants, anoionic surfactants, complexing agents, polyelectrolyte leachants, mineral acids, and organic acids is added in a controlled manner via at least one bore hole which permit the water to permeate into the area between the electrodes.

15. A method as claimed in claim 14, wherein the at least one bore hole is positioned between the anode and cathode.

16. The method as claimed in claim 14, wherein the at least one bore hole is positioned outside of an area between the cathode and the electrode.

* * * * *